US008421752B2

(12) United States Patent
Deluca

(10) Patent No.: US 8,421,752 B2
(45) Date of Patent: Apr. 16, 2013

(54) PORTABLE ELECTRONIC DEVICE AND METHOD THEREFOR

(75) Inventor: Michael Joseph Deluca, Boca Raton, FL (US)

(73) Assignee: Research In Motion Limited, Waterloo (CA)

( * ) Notice: Subject to any disclaimer, the term of this patent is extended or adjusted under 35 U.S.C. 154(b) by 141 days.

(21) Appl. No.: 13/015,039

(22) Filed: Jan. 27, 2011

(65) Prior Publication Data

US 2012/0194432 A1 Aug. 2, 2012

(51) Int. Cl.
G06F 3/033 (2006.01)

(52) U.S. Cl.
USPC ......... 345/158; 345/173; 345/179; 178/18.01

(58) Field of Classification Search ............ 345/76, 345/82, 87, 156–158, 173, 177, 179–181, 345/419; 178/18.01, 18.03, 18.04, 19.01, 178/19.02; 715/862, 863
See application file for complete search history.

(56) References Cited

U.S. PATENT DOCUMENTS

| | | | |
|---|---|---|---|
| 6,388,657 B1 | 5/2002 | Natoli | |
| 7,365,737 B2 | 4/2008 | Marvit et al. | |
| 8,060,841 B2* | 11/2011 | Boillot et al. | 715/863 |
| 8,219,936 B2* | 7/2012 | Kim et al. | 715/862 |
| 2007/0164988 A1 | 7/2007 | Ryu | |
| 2007/0176898 A1* | 8/2007 | Suh | 345/158 |
| 2007/0211022 A1 | 9/2007 | Boillot | |
| 2008/0005703 A1 | 1/2008 | Radivojevic et al. | |
| 2008/0100572 A1* | 5/2008 | Boillot | 345/158 |
| 2008/0111710 A1* | 5/2008 | Boillot | 341/22 |
| 2009/0139778 A1 | 6/2009 | Butler et al. | |
| 2010/0053151 A1* | 3/2010 | Marti et al. | 345/419 |
| 2010/0097318 A1* | 4/2010 | Wehrenberg et al. | 345/158 |
| 2010/0125816 A1 | 5/2010 | Bezos | |
| 2011/0041100 A1* | 2/2011 | Boillot | 715/863 |
| 2011/0175843 A1* | 7/2011 | Bachfischer et al. | 345/174 |

FOREIGN PATENT DOCUMENTS

| | | |
|---|---|---|
| EP | 2187298 A2 | 5/2010 |
| WO | 2008001202 | 1/2008 |
| WO | 2010044579 | 4/2010 |

OTHER PUBLICATIONS

European Search Report: EP App. No. 11152333.8 dated Jun. 8, 2011.

* cited by examiner

*Primary Examiner* — Joe H Cheng
(74) *Attorney, Agent, or Firm* — Novak Druce Connolly Bove + Quigg LLP

(57) ABSTRACT

An electronic device includes an object sensor for detecting motion of an object, such as a stylus or finger, relative to device and during a period of contactless object movement. A motion sensor, such as an accelerometer, detects device motion during the period of contactless object movement. A processor determines a gesture that corresponds to the movement of the object and to movement of the device. This device, and the associated method, results in a more accurate determination of an intended gesture, such as a three-dimensional gesture. For example, the processor, or gesture determinator, can compensate for movement of the device when determining the gesture corresponding to detected contactless movement of the object.

20 Claims, 6 Drawing Sheets

PORTABLE ELECTRONIC DEVICE AND METHOD THEREFOR

FIELD

The present disclosure relates to an electronic device including but not limited to a portable electronic device having a touch-sensitive display.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed.

Improvements in electronic devices with touch-sensitive displays are desirable.

SUMMARY

In an example embodiment of the present disclosure, a portable electronic device includes an object sensor, a motion sensor, and a processor in communication with the object sensor and the motion sensor. The object sensor detects movement of an object relative to the device during a period of contactless object movement. The motion sensor detects motion of the device during the period of contactless object movement. The processor, or gesture determinator, is configured to determine a gesture that corresponds to the movement of the object and to the movement of the device during the period of contactless object movement. In an example embodiment, the processor is configured to compensate for the device movement when determining the gesture, such as by subtracting the device movement from the object movement.

In another example embodiment, the object sensor comprises a three-dimensional object sensor for detecting three-dimensional motion of the object above the device, the motion sensor comprises a three-dimensional motion sensor for detecting three-dimensional motion of the device, and the processor is configured to determine a three-dimensional gesture that corresponds to the three-dimensional movement of the object and the three-dimensional movement of the device.

In another example embodiment, the object sensor detects positions of the object during the period of contactless object movement, and the processor and the object sensor cooperate to determine the object movement based on the detected object positions.

In yet another example embodiment, the object sensor comprises a plurality of sensors. In an embodiment, the object sensor comprises an ultrasonic sensor, an infrared sensor, a video sensor, or any combination thereof. In an example embodiment, the ultrasonic sensor is for detecting motion of the object by sensing Doppler shift during the period of contactless object movement. In an example embodiment, the motion sensor comprises an accelerometer or a gyroscope.

In an example embodiment of the present disclosure, a portable electronic device includes an object sensor arranged to detect movement of an object relative to the device during a period of three-dimensional object movement. The portable electronic device has a motion sensor arranged to detect movement of the device during the period of three-dimensional object movement, and a gesture determinator in communication with the object sensor and the motion sensor. The gesture determinator is configured to determine a three-dimensional gesture that corresponds to the movement of the object and to the movement of the device during the period of three-dimensional object movement.

In another example embodiment, the period of three-dimensional object movement comprises a period of contactless object movement, and the gesture determinator is configured to determine the three-dimensional gesture that corresponds to the movement of the object and to the movement of the device during the period of contactless object movement. In an example embodiment, the gesture determinator is configured to compensate for the device movement when determining the gesture.

In another example embodiment of the present disclosure, a method of gesture detection for a portable electronic device is provided. The method includes: detecting movement of an object relative to the device during a period of contactless object movement; detecting movement of the device during the period of contactless object movement; and determining a gesture that corresponds to the movement of the object and to the movement of the device during the period of contactless object movement.

In an example embodiment, determining the gesture comprises compensating for the device movement, such as by subtracting the device movement from the movement of the object.

In another example embodiment, detecting movement of the object comprises detecting three-dimensional movement of the object above the device; detecting movement of the device comprises detecting three-dimensional movement of the device, and determining the gesture comprises determining a three-dimensional gesture that corresponds to the three-dimensional movement of the object and the three-dimensional movement of the device.

In an example embodiment, detecting the motion of the object comprises detecting positions of the object during the period of contactless object movement, and determining the object motion based on the detected object positions.

In another example embodiment of the present disclosure, a non-transitory machine-readable memory is provided storing statements and instructions for execution by a processor to perform a method of gesture detection for a portable electronic device as described and illustrated herein.

Other aspects and features of the present disclosure will become apparent to those ordinarily skilled in the art upon review of the following description of specific embodiments in conjunction with the accompanying figures.

BRIEF DESCRIPTION OF THE DRAWINGS

Example embodiments of the present disclosure will now be described, by way of example only, with reference to the attached figures.

DETAILED DESCRIPTION

Figure 1:
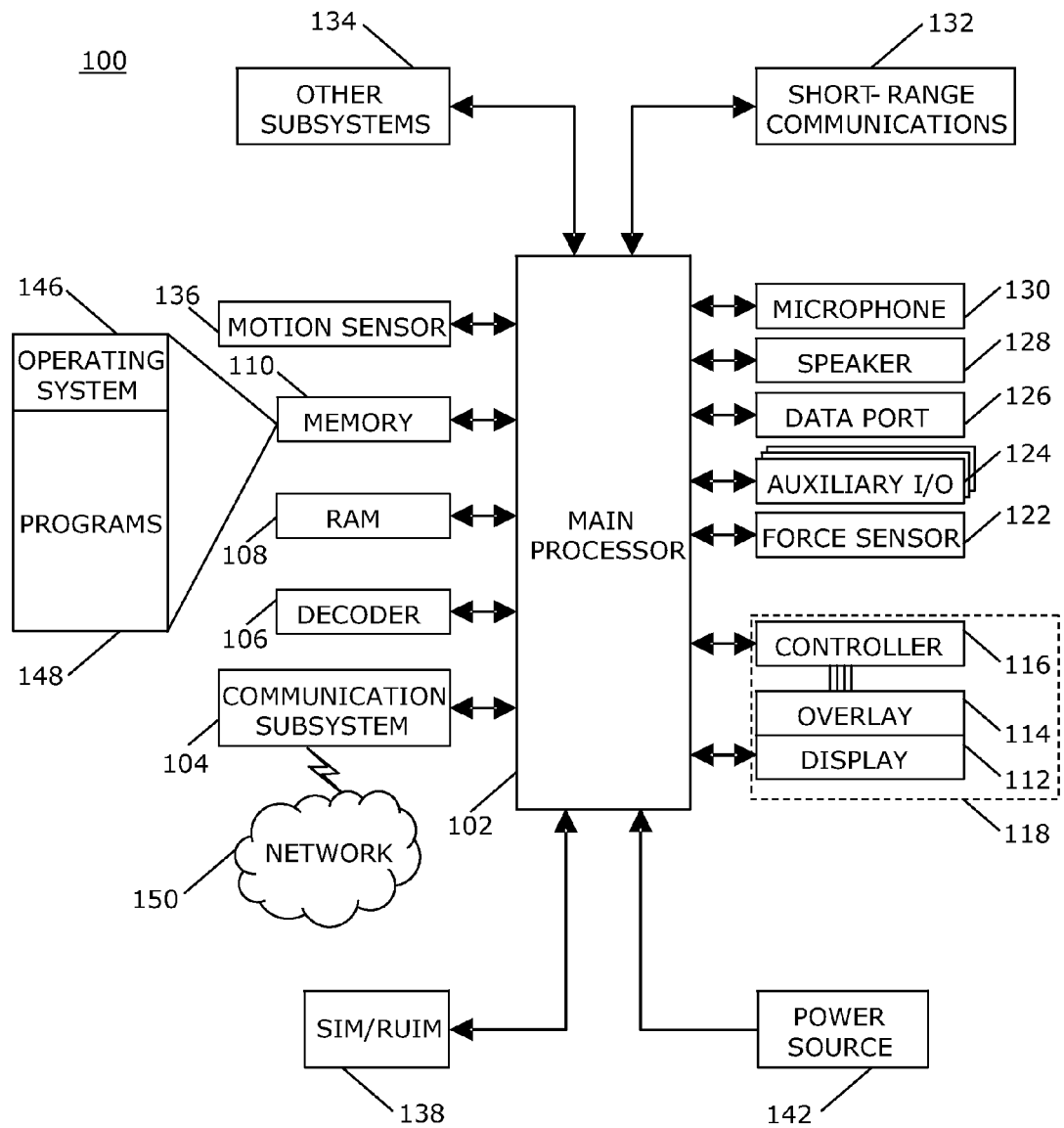
FIG. 1 is a block diagram of a portable electronic device in accordance with an example embodiment.

In an aspect, the present disclosure provides an electronic device including an object sensor for detecting positions of an object, such as a stylus or finger, relative to device and during a period of contactless object movement. A motion sensor, such as an accelerometer, detects device motion during the period of contactless object movement. A processor determines a gesture that corresponds to the movement of the object and to movement of the device. This device, and the associated method, results in a more accurate determination of an intended gesture, such as a three-dimensional gesture. For example, the processor, or gesture determinator, can compensate for movement of the device when determining the gesture corresponding to detected contactless movement of the object.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

This disclosure generally relates to an electronic device, which is a portable electronic device in the embodiments described herein. Examples of portable electronic devices include mobile, or handheld, wireless communication devices such as pagers, cellular phones, cellular smartphones, wireless organizers, PDAs, wirelessly enabled notebook computers, tablet computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communication subsystem 104 and a short-range communications 132 module to perform various communication functions, including data and voice communications. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, an auxiliary input/output (I/O) subsystem 124, a data port 126, a speaker 128, a microphone 130, short-range communications 132, and other device subsystems 134. User-interaction with a graphical user interface presented on display 112 is performed through the touch-sensitive overlay 114. The memory 110 can include graphics memory accessed by the controller 116 to render graphic content for display on to the display 112. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor or a motion sensor 136, such as an accelerometer or gyroscope, that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The controller 116 and/or the processor 102 may detect a touch by any suitable contact member on the touch-sensitive display 118. Similarly, multiple simultaneous touches are detected.

One or more gestures are also detected by the touch-sensitive display 118. A gesture, such as a swipe, also known as a flick, is a particular type of touch on a touch-sensitive display 118 that begins at an origin point and continues to a finishing point. A gesture may be identified by attributes of the gesture, including the start point, the end point, the distance traveled, the duration, the velocity, and the direction, for example. A gesture may be long or short in distance and/or duration. Two points of the gesture may be utilized to determine a direction of the gesture.

In some embodiments, optional force sensor(s) 122 may be disposed in any suitable location, for example, between the touch-sensitive display 118 and a back of the portable electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities. The processor 102 may also interact with one or more force sensors 122.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
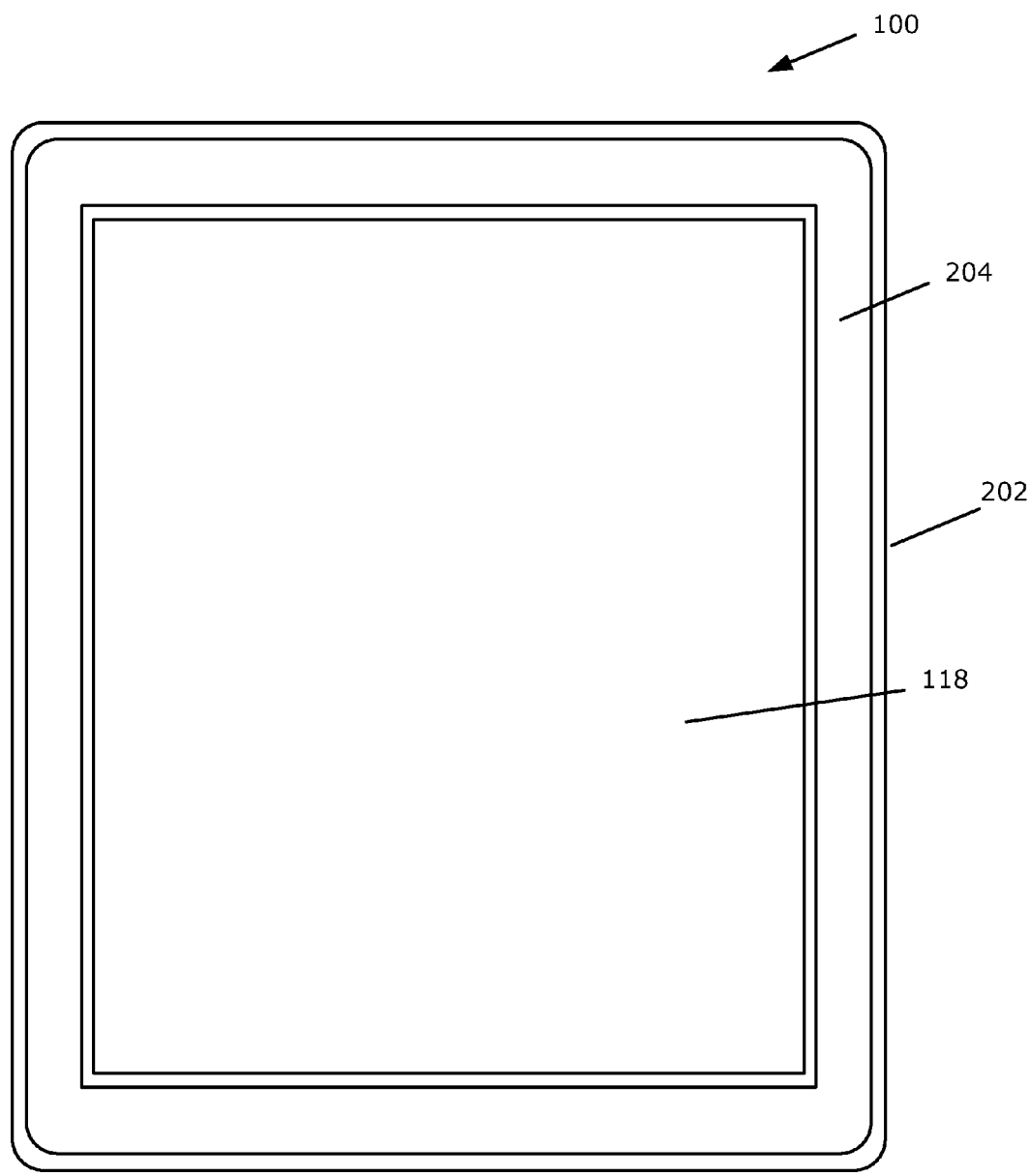
FIG. 2 is a front view of an example of a portable electronic device.

A view of an example of the portable electronic device 100 is shown in FIG. 2. The portable electronic device 100 includes a housing 202 that encloses components such as shown in FIG. 1. The housing 202 may include a front 204, and a back and sidewalls (not shown). The front 204 of the housing includes openings in which the touch-sensitive display 118 is exposed.

Detection of touches or gestures on a touch-sensitive display 118 of the device 100 provides navigational advantages. Detection of gestures? relative to the device, such as above the display 112, allows for enhanced user interface (UI) functionality. However, if the device 100 is held in one hand of a user and the gesture is made or caused by the user's other hand, movement of the device may be mistakenly processed and determined to be movement associated with the gesture being made above the device, resulting in an erroneous determination of the gesture. In the present disclosure, the terms "motion" and "movement" are used interchangeably.

A contactless position, or contactless object position, is an object position at which the object is free of contact with the portable electronic device 100. For example, an object is in a contactless object position when the object is free of contact with the display 112. Contactless object movement is an object movement during which the object is free of contact with the device 100. A contactless gesture is based on contactless object movement. For example, a contactless gesture can include a contactless object movement above the display 112 of the device 100, without making contact with the display 112. Contactless object position and movement is in contrast to a gesture made on the display 112, such as the type of gesture typically associated with a device having a touch-sensitive display.

A three-dimensional gesture includes a gesture associated with movement that has at least one component in an axis or plane additional to the plane of the display 112 of the device 100. A standard gesture on a touch-sensitive display can include movement in the x and y axes and can also include contributions based on time delay, force intensity, and other factors. A three-dimensional gesture is a gesture performed relative to the device 100, such as above the display 112 in the z axis. Adding a further z axis component to a gesture can expand the number, type and variation of gestures that can be used to control the device 100. In example embodiments described herein, a contactless three-dimensional gesture is performed relative to the device 100 without making contact with the display 112.

In some example embodiments, the three-dimensional gesture is performed relative to the device 100 without making contact with the display 112. In other example embodiments, the three-dimensional gesture includes some contact with the display 112.

Examples of three-dimensional gestures and their determination are discussed in United States Patent Application Publication No. 2008/005703A1 entitled "Apparatus, methods and computer program products providing finger-based and hand-based gesture commands for portable electronic device applications". Other discussions of examples of three-dimensional gestures and their determination are found in the following: United States Patent Application Publication No. 2009/0139778A1 entitled "User Input Using Proximity Sensing"; United States Patent Application Publication No. 2007/02211022A1 entitled "Method and Device for Three-Dimensional Sensing". Each of these documents is incorporated herein by reference.

Figure 3:
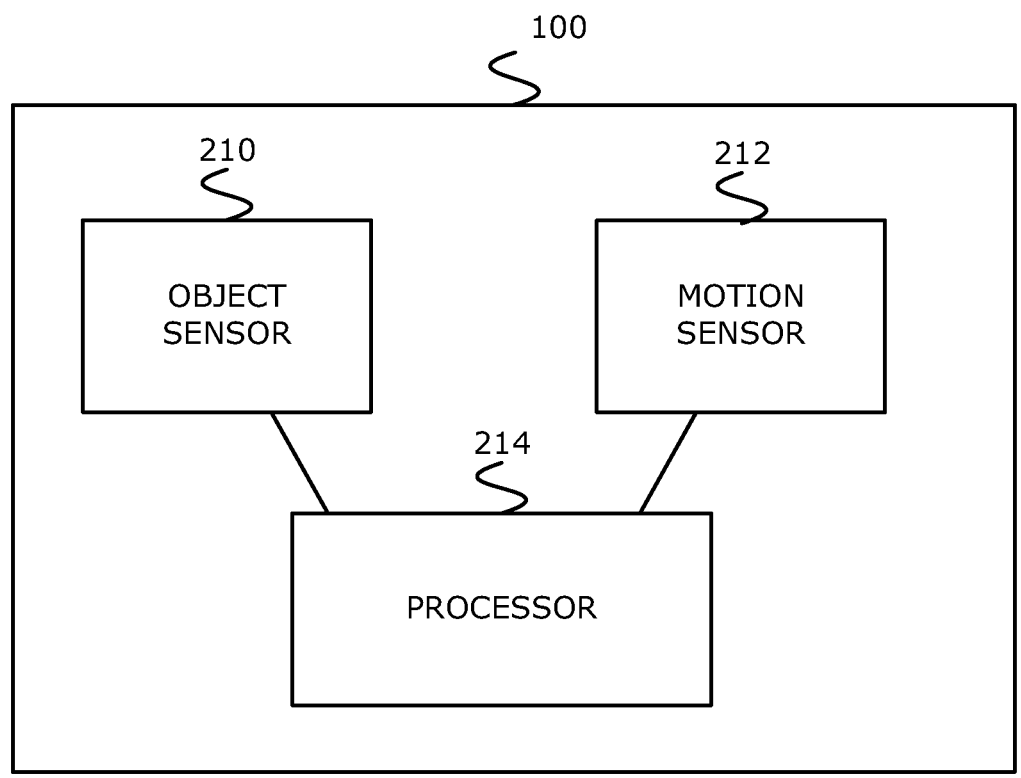
FIG. 3 illustrates a portable electronic device according to an example embodiment.

FIG. 3 illustrates a portable electronic device 100 according to an example embodiment. The device 100 comprises an object sensor 210, such as a motion sensor, arranged to detect movement of an object relative to the device during a period of contactless object movement. In an example embodiment, the object sensor 210 comprises a plurality of sensors. The object sensor 210 can comprise an ultra-sonic sensor, an infrared sensor, a video sensor, or any combination thereof. In an example embodiment, the object sensor 210 is a three-dimensional object sensor for detecting three-dimensional movement of the object above the device 100.

In an example embodiment, the object sensor 210 detects movement of an object relative to the device 100 during a period of contactless object movement, and also detects movement of the object during a period of object movement in which device contact occurs. For example, the device can determine that a contactless object movement is associated with a different gesture if the contactless object movement is be followed by a particular contact with the device, such as tapping a particular location of the display.

In an example embodiment, the object sensor 210 detects positions of the object during the period of contactless object movement. In that case, a processor 214 and the object sensor 210 cooperate to determine the object movement based on the detected object positions, such as by determining a change in a position over time. In another example embodiment, the object sensor 210 detects motion instead of, or in addition to, detecting position, such as by using an ultrasonic sensor measuring Doppler shift.

In an example embodiment, the period of contactless object movement begins upon first detection of the presence of the object relative to the device, and ends when object movement is not detected for a period of time. In another example embodiment, in which object positions are detected in order to determine object movement, the period of contactless object movement ends when two or more consecutive detected object positions are substantially similar. In another example embodiment, the period of contactless object movement ends when the device determines that detected object movement corresponds to movement associated with a known gesture, such as stored in a gesture database in a memory of the device 100.

As shown in FIG. 3, the device 100 also comprises a motion sensor 212 arranged to detect movement of the device during the period of contactless object movement. The motion sensor 212 can comprise an accelerometer or a gyroscope, or any other component or combination of components able to detect or sense movement of the device. Accelerometers and gyroscopes detect motion by sensing accelerations. In an example embodiment, the motion sensor 212 is integral with the motion sensor 136 shown in FIG. 1.

The device 100 further comprises a processor 214, or gesture determinator. The processor 214 is in communication with the object sensor 210 and the motion sensor 212. The processor 214 is configured to determine a gesture that corresponds to the movement of the object and to the movement of the device during the period of contactless object movement. In an example embodiment, the processor 214 is integral with the processor 102, or integral with the electronic controller 116 shown in FIG. 1. In another example embodiment, the processor 214 is provided as a separate processor.

In an embodiment, the processor 214 is configured to compensate for the device movement when determining the gesture. In an example embodiment, the compensation comprises subtracting the device movement from the detected movement of the object. In another embodiment, the compensation comprises canceling the device movement from the detected movement of the object, which can include second order or other non-linear operations.

In an example embodiment, the processor 214 is configured to determine a three-dimensional gesture that corresponds to the movement of the object and the movement of the device. The three-dimensional gesture is performed by the object relative to the device, such as above the display 112 of the device 100. In such an embodiment, the object sensor 210 comprises a three-dimensional object sensor for detecting three-dimensional movement of the object above the device, and the motion sensor 212 comprises a three-dimensional motion sensor for detecting three-dimensional movement of the device. In an example embodiment, the motion sensor 212 can comprise an accelerometer that detects acceleration along a plurality of axes, or a plurality of accelerometers that each detects acceleration along a single axis. In such an embodiment, the processor 214 determines the three dimensional gesture that corresponds to the three-dimensional movement of the device and the three-dimensional movement of the object.

Figure 4:
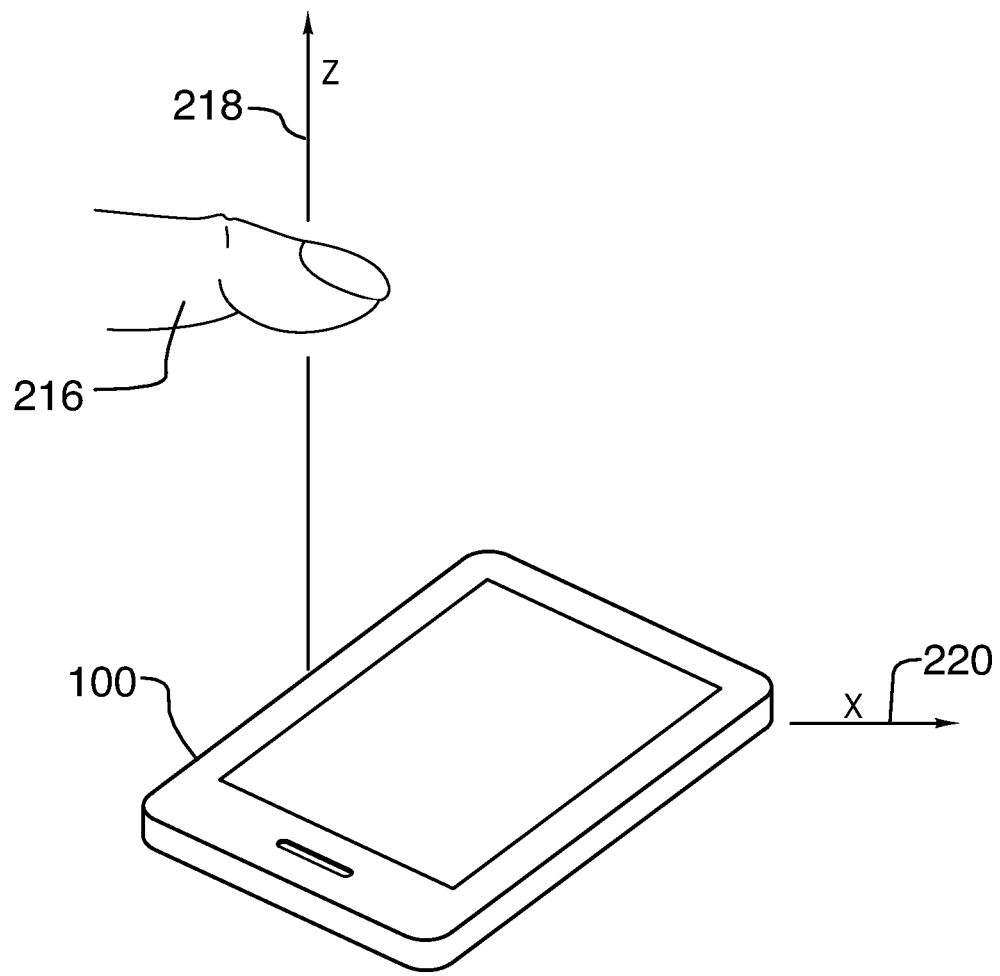
FIG. 4 illustrates an example of movement of an object (exemplified by a finger) in relation to a device according to an example embodiment.

FIG. 4 illustrates an example of movement of an object 216 in relation to a device 100 according to an example embodiment. The object 216 can be, for example, a finger, thumb, appendage, or other items, for example, a stylus, pen, or other pointer. The actual object movement 218 is determined relative to the device 100 during a period of contactless object movement. While the object movement 218 is shown in FIG. 4 as being along a z axis, it is to be understood that the object movement can occur in one or more of the x, y and z axes. Similarly, while the device movement 220 is shown in FIG. 4 as being along an x axis, it is to be understood that the device movement can occur in one or more of the x, y and z axes. FIG. 4 illustrates an example embodiment in which the contactless object movement is associated with a three-dimensional gesture, since the movement includes a z axis component.

Figure 5:
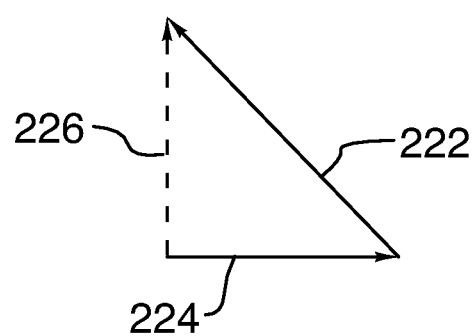
FIG. 5 is a geometric illustration of calculation of object movement based on detected object movement and detected device movement.

FIG. 5 is a geometric illustration of calculation of object movement based on detected object movement and detected device movement. Consider an example embodiment in which the object sensor 210 detects object movement 222 along one or more of x, y and z axes, and the motion sensor 212 detects device movement 224 along one or more of x, y and z axes. In such an embodiment, the processor 214 calculates an object movement 226 based on the detected object movement 222 and the detected device movement 224, such as by subtracting the detected device movement 224 from the detected object movement 222. The calculated object movement 226 of FIG. 5 is substantially equivalent to the actual object movement 218 in FIG. 4.

In an example embodiment, and in one mode, the processor 214 is configured to compensate for the device movement when determining the gesture. For example, device x, y and z movements can be subtracted from the object x, y and z movements, as shown diagrammatically in FIG. 5. In this example, the gesture is determined after the compensation. In an embodiment, the compensation is provided in one, two or three dimensions or planes, corresponding to the planes of the object movement. For example, if the object movement is only in two planes, the compensation need only be in those two planes.

In another example embodiment and in another mode, the processor 214 is configured to enhance the gesture based on the device movement. For example, a three-dimensional gesture can comprise a compound gesture that includes a prescribed movement of the device. In a particular example, gesturing the shape of the letter "R" above the display while shaking the device in a prescribed manner initiates a function to "reply all" to a displayed message, whereas gesturing the "R" with no device shaking initiates a function to reply only to the sender.

If the object movement has a particular geometric movement, a suitable corresponding coordinate system may be used. For instance, polar or rectangular coordinates can be used to calculate or describe the gesture or movement. In an embodiment, polar calculations can be used to determine the gesture and converted to x, y, z analysis.

Figure 6:
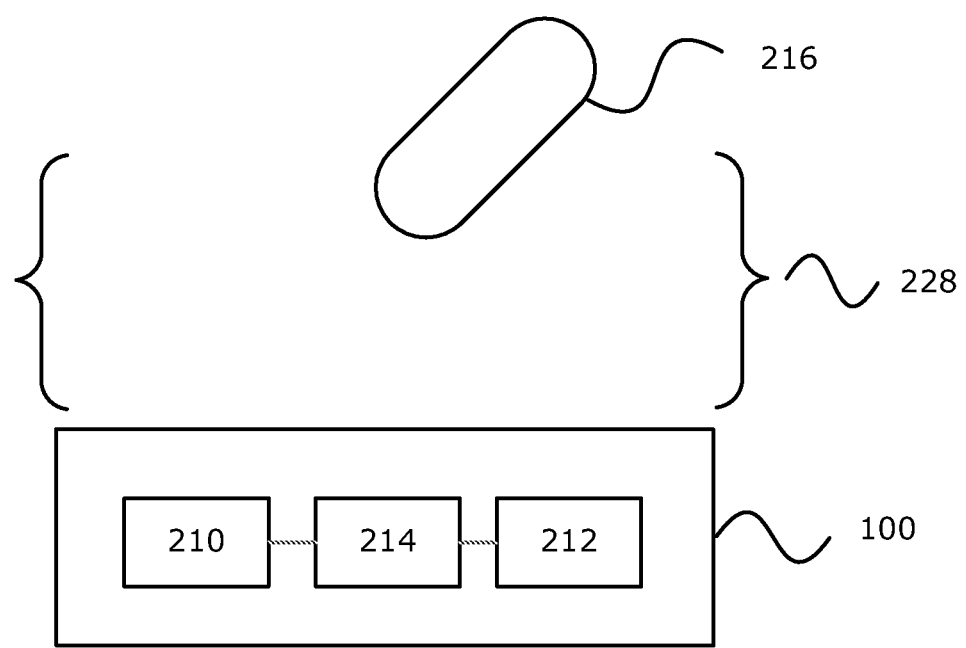
FIG. 6 illustrates a portable electronic device according to another example embodiment.

FIG. 6 illustrates a portable electronic device 100 according to another example embodiment. As shown in FIG. 6, the device 100 comprises the previously-described object sensor 210, the motion sensor 212 and the processor or gesture determinator 214. FIG. 6 also illustrates a representation of the object 216, the movement of which, and optionally the position of which, is detected and determined relative to the device 100. In an embodiment, the object sensor 210 is configured to detect movement of the object 216 in a gesture space relative to the device 100 during a period of three-dimensional object movement. In the example embodiment of FIG. 6, a gesture space 228 is defined above a display of the device 100.

The gesture determinator 214 is in communication with the object sensor 210 and the motion sensor 212. In an example embodiment, the gesture determinator 214 comprises firmware or hard-wired circuitry. The gesture determinator 214 is configured to determine a three-dimensional gesture that corresponds to the movement of the object and to the movement of the device during the period of three-dimensional object movement. In the embodiment of FIG. 6, the three-dimensional object movement can include a contactless object movement, or an object movement including both a contactless portion and a portion with device contact. In an example embodiment in which the period of three-dimensional object movement comprises a period of contactless object movement, the gesture determinator is configured to determine the three-dimensional gesture that corresponds to the movement of the object and to the movement of the device during the period of contactless object movement.

Figure 7:
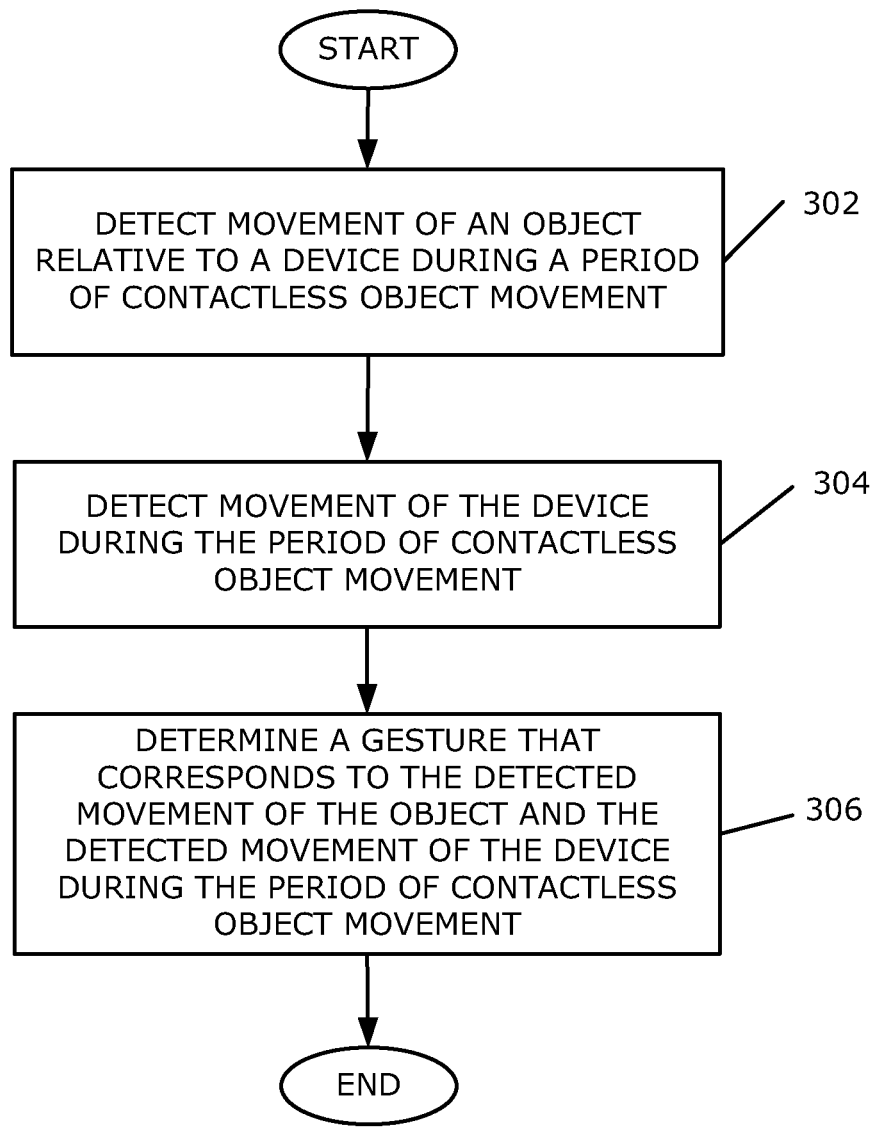
FIG. 7 is a flowchart illustrating a method of gesture detection for a portable electronic device, such as the portable electronic device 100, according to an example embodiment.

FIG. 7 is a flowchart illustrating a method of gesture detection for a portable electronic device, such as the portable electronic device 100, according to an example embodiment. In an example embodiment, the method is carried out by computer-readable code executed, for example, by the processor 102, the electronic controller 116, or the processor 214. Coding of software for carrying out such a method is within the scope of a person of ordinary skill in the art given the present description. The method may contain additional or fewer processes than shown and/or described, and may be performed in a different order.

The method of the example embodiment of FIG. 7 includes the following: detecting movement of an object relative to the device during a period of contactless object movement at 302; detecting movement of the device during the period of contactless object movement (304); and determining a gesture that corresponds to the movement of the object and to the movement of the device during the period of contactless object movement at 306. In an example embodiment, determining the gesture at 306 comprises compensating for the device movement, such as by subtracting the device movement from the detected movement of the object.

In an example embodiment: detecting movement of the object at 302 comprises detecting three-dimensional movement of the object above the device; detecting movement of the device at 304 comprises detecting three-dimensional movement of the device; and determining the gesture at 306 comprises determining a three-dimensional gesture that corresponds to the three-dimensional movement of the object and the three-dimensional movement of the device. In an example embodiment, detecting the motion of the object at 302 comprises detecting positions of the object during the period of contactless object movement, and determining the object motion based on the detected object positions.

Aspects of the present disclosure provide enhanced determination of a gesture of an object relative to an electronic device, such as a portable electronic device, and during a period of contactless object movement. A motion sensor, such as an accelerometer, detects device movement that occurs while detecting movement of the object, so that a processor determines a gesture that corresponds to the detected movement of the object and the detected movement of the device. For example, the processor can compensate for movement of the device when determining the gesture corresponding to detected movement of the object. A method or device according to example embodiments of the present disclosure result in a more accurate determination of an intended gesture, such as a three-dimensional gesture.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A portable electronic device comprising:
an object sensor for detecting x, y and z axis motion of an object relative to the device during a period of contactless object movement;
a motion sensor for detecting x, y and z axis movement of the device during the period of contactless object movement; and
a processor in communication with the object sensor and the motion sensor, the processor configured to determine a three-dimensional gesture that corresponds to the movement of the object and to the movement of the device during the period of contactless object movement, the three dimensional gesture being associated with detected object motion that has at least one component measured in an axis or place additional to the plane of a display of the device, the display being on a plane defined by the x and y axes.

2. The portable electronic device of claim 1 wherein the processor is configured to compensate for the device movement when determining the gesture.

3. The portable electronic device of claim 2 wherein the processor is configured to subtract the device movement from the movement of the object.

4. The portable electronic device of claim 1 wherein:
the object sensor comprises a three-dimensional object sensor for measuring three-dimensional motion of the object above the device;

the motion sensor comprises a three-dimensional motion sensor for detecting three-dimensional movement of the device; and the processor is configured to determine a three-dimensional gesture that corresponds to the three-dimensional movement of the object and the three-dimensional movement of the device.

5. The portable electronic device of claim 1 wherein the object sensor detects positions of the object during the period of contactless object movement, and wherein the processor and the object sensor cooperate to determine the object movement based on the detected object positions.

6. The portable electronic device of claim 1 wherein the motion sensor comprises an accelerometer.

7. The portable electronic device of claim 1 wherein the motion sensor comprises a gyroscope.

8. The portable electronic device of claim 1 wherein the object sensor comprises a plurality of sensors.

9. The portable electronic device of claim 1 wherein the object sensor comprises an ultrasonic sensor for detecting motion of the object by measuring Doppler shift during the period of contactless object movement.

10. The portable electronic device of claim 1 wherein the object sensor comprises an infrared sensor.

11. A method of gesture detection for a portable electronic device comprising:

detecting x, y and z axis movement of an object relative to the device during a period of contactless object movement;

detecting x, y and z axis movement of the device during the period of contactless object movement; and determining a three-dimensional gesture that corresponds to the movement of the object and to the movement of the device during the period of contactless object movement, the three-dimensional gesture being associated with detected object motion that has at least one component measured in an axis or plane additional to the plane of a display of the device, the display being on a plane defined by the x and y axes.

12. The method of claim 11 wherein determining the gesture comprises compensating for the device movement.

13. The method of claim 12 wherein compensating for the device movement comprises subtracting the device movement from the movement of the object.

14. The method of claim 11 wherein:

detecting movement of the object comprises measuring three-dimensional motion of the object above the device;

detecting movement of the device comprises detecting three-dimensional movement of the device; and determining the gesture comprises determining a three-dimensional gesture that corresponds to the three-dimensional movement of the object and to the three-dimensional movement of the device.

15. The method of claim 11 wherein detecting the movement of the object comprises detecting positions of the object during the period of contactless object movement, and determining the object movement based on the detected object positions.

16. A non-transitory machine-readable memory storing statements and instructions for execution by a processor to perform a method of gesture detection for a portable electronic device comprising:

detecting x, y and z axis movement of an object relative to the device during a period of contactless object movement;

detecting x, y and z axis movement of the device during the period of contactless object movement; and determining a three-dimensional gesture that corresponds to the movement of the object and to the movement of the device during the period of contactless object movement, the three-dimensional gesture being associated with detected object motion that has at least one component measured in an axis or plane additional to the plane of display of the device, the display being on a plane defined by the x and y axes.

17. The non-transitory machine-readable memory of claim 16 wherein, in the method, determining the gesture comprises compensating for the device movement.

18. The non-transitory machine-readable memory of claim 17 wherein, in the method, compensating for the device movement comprises subtracting the device movement from the movement of the object.

19. The non-transitory machine-readable memory of claim 16 wherein, in the method, detecting movement of the object comprises detecting three-dimensional positions of the object above the device;

detecting movement of the device comprises detecting three-dimensional positions of the device; and determining the gesture comprises determining a three-dimensional gesture that corresponds to the three-dimensional movement of the object and to the three-dimensional movement of the device.

20. The non-transitory machine-readable memory of claim 16 wherein, in the method, detecting the motion of the object comprises detecting positions of the object during the period of contactless object movement, and determining the object motion based on the detected object positions.

* * * * *